US007465229B2

(12) United States Patent
Shuster

(10) Patent No.: US 7,465,229 B2
(45) Date of Patent: Dec. 16, 2008

(54) SLOT-MACHINE GAME WITH ADJUSTING PAYOUT TABLE

(75) Inventor: Gary Stephen Shuster, Fresno, CA (US)

(73) Assignee: Hoshiko LLC, Henderson, NV (US)

( * ) Notice: Subject to any disclaimer, the term of this patent is extended or adjusted under 35 U.S.C. 154(b) by 316 days.

(21) Appl. No.: 10/397,470

(22) Filed: Mar. 26, 2003

(65) Prior Publication Data

US 2004/0072603 A1 Apr. 15, 2004

Related U.S. Application Data

(60) Provisional application No. 60/368,010, filed on Mar. 26, 2002.

(51) Int. Cl.
*A63F 13/00* (2006.01)

(52) U.S. Cl. ............................ 463/21; 463/16; 463/20; 463/25

(58) Field of Classification Search .................. 463/25, 463/16–21
See application file for complete search history.

(56) References Cited

U.S. PATENT DOCUMENTS 4,517,558 A * 5/1985 Davids ....................... 345/629
5,123,649 A * 6/1992 Tiberio ................... 273/143 R
5,167,413 A * 12/1992 Fulton ......................... 463/13
5,704,835 A * 1/1998 Dietz, II ...................... 463/20
5,720,662 A * 2/1998 Holmes et al. ................ 463/20
5,775,692 A * 7/1998 Watts et al. ............. 273/143 R
6,648,758 B2 * 11/2003 Bennett et al. ................ 463/20
6,731,313 B1 * 5/2004 Kaminkow ................. 715/839
6,780,109 B2 * 8/2004 Kaminkow .................. 463/20
2003/0060256 A1 * 3/2003 Joshi ........................... 463/16
2003/0100357 A1 * 5/2003 Walker et al. ................. 463/16

FOREIGN PATENT DOCUMENTS

GB 2062922 A * 5/1981
GB 2112984 A * 7/1983

* cited by examiner

*Primary Examiner*—Scott Jones
*Assistant Examiner*—Ross A. Williams
(74) *Attorney, Agent, or Firm*—Connolly Bove Lodge & Hutz LLP; Jonathan A. Jaech

(57) ABSTRACT

A gaming apparatus, such as a slot machine, that randomly determines a combination of symbols and pays prizes according to a determined payout table, is used to perform a gaming method similar to conventional slot machine play, but that permits greater interaction with the player. The gaming method provides the player with the option of increasing an amount wagered after at least one of the symbols has been determined. The method additionally provides the player with the option to randomly determine a symbol or symbols a second time, or to force a symbol to be the same as a symbol already determined, optionally at additional cost. The method includes making appropriate adjustments to a payout table, depending on the player's actions during game play.

19 Claims, 2 Drawing Sheets

SLOT-MACHINE GAME WITH ADJUSTING PAYOUT TABLE

CROSS-REFERENCE TO RELATED APPLICATION

This application claims priority pursuant to 35 U.S.C. §119 (e) to U.S. Provisional Application No. 60/368,010, filed Mar. 26, 2002, which application is specifically incorporated herein, in its entirety, by reference.

BACKGROUND OF THE INVENTION

1. Field of the Invention

The present invention relates to a method and apparatus for slot machine gaming, and more particularly, to type of slot machine gaming in which a plurality of actual or simulated reels are spun to determine a combination of symbols, wherein prizes are paid depending on the resulting combination.

2. Description of Related Art

The term "slot machine" is generally used herein to refer to any automatic machine designed to accept cash from a user in exchange for playing a game of chance, and to pay a prize ("payout") to the user depending on the result of the game. The results of the game of chance are determined by the slot machine. The user is not able to influence the probability of winning, although some machines may provide the user with limited influence over individual game results (i.e., provide a "nudge" function) to make playing the machine more appealing. Cash may be accepted in any suitable form, including as redeemable tokens, currency or electronic credit. Similarly, prizes may be paid in any suitable form.

Over the years, gamblers have come to expect a slot machine to typically include a pull arm for initiating a game, three or four spinning cylinders with colorful symbols, and a hopper into which winnings are deposited in the form of currency or tokens. In most modern slot machines, a plurality of actual or electronically simulated reels are spun to determine a combination of symbols, and prizes are paid depending on the resulting combination. Certain combinations provide higher payouts, and the amount of payout is inversely related to the probability of achieving a particular combination. The lower the probability of achieving a combination, the higher the payout for that combination. For the many of the most common combinations, no prize is paid.

The outcome of each game is randomly determined, but the operator is able to determine the percentage of money deposited that will be paid out, so that over the long run, the house always wins. The ratio of money that is paid out in prizes for a particular machine, compared to the amount paid to play, averaged over many plays, is known as the "payout ratio" for that machine. Different machines may have different payout ratios. In modern slot machines, the payout ratio of the machines can be electronically set, and may be set differently in different machines.

While slot machines remain quite popular, a slot machine, unlike many other games of chance, provides a minimal amount of interaction for the player. After the slot machine lever is pulled (or the start button is pressed, as the case may be), the machine play to obtain a result that seems predetermined. As a result, many people find slot machine play relatively boring. A slot machine that provided novel and more interactive methods of play may appeal to more potential players, and hold players' interest for a greater number of additional plays. It is desirable, therefore, to provide a slot machine that permits a user to play in a new, more interesting and engaging manner, while still retaining certain characteristics of conventional slot machines.

SUMMARY OF THE INVENTION

The present invention provides a method and apparatus for gaming, that overcomes the limitations of the prior art. The invention preserves many of the appealing features of slot-machine gaming, while permitting greater interaction for the player during play of the game.

In an embodiment of the invention, the method permits the player to wager additional money during play of the game, while at least one reel continues to spin. It should be appreciated that the slot machine may employ actual electronically-controlled physical reels according to popular traditional slot machine designs, or electronically simulated reels displayed on one or more display screens, as also know in the art. Either way, so long as one or more reels continue to "spin," the probability of any particular combination being achieved may be calculated based on the symbol or symbols already determined by the reel or reels that have already been stopped—i.e., the state of the machine at that time.

Therefore, according to the invention, an additional wager may be accepted at some point before all reels have stopped spinning, according to the probabilities determined by the machine state when he wager is accepted. Optionally, the payoff table for the total amount wagered, or some portion of it, may be displayed both before and after an additional amount is wagered. For example, the payoff table for an initial one dollar wager may define a jackpot amount of $1000. After the first reel has stopped on a symbol that can be part of a jackpot combination, the player may wish to increase the bet by a dollar. Because the probability of winning is higher when the machine is in this state, the jackpot will be increased by some amount less than $1000, for example, by $400. For a total wager of two dollars, the jackpot would be increased to a total of $1400, in this example.

In the alternative, or in addition, players may be given the option to "re-spin" one or more reels after at least one reel has stopped and before the game has terminated. If the player selects this option, the payoff table is adjusted according to the effect that the additional spin or spins has on winning. Because each additional spin increases the chances of winning, the slot machine should adjust the prize amounts downward with each additional spin, permit the player to wager additional money in exchange for re-spinning the reels, or some combination of the foregoing. Optionally, the anticipated and/or actual playoff table may be displayed before the user elects to re-spin a reel.

In an embodiment of the invention, the option to re-spin a reel may be provided after all the reels have stopped, but before a prize has been paid. This option would be appropriate when the player has won a prize amount less than the maximum amount achievable. In such case, a player may be willing to forego the lesser prize for a chance to achieve a greater prize. Thus, a payoff table may be calculated for the combinations that may result from the additional spin, using the winnings from the last result as the amount of the wager. In the alternative, or in addition, a player may be permitted to wager an additional amount in exchange for re-spinning a single reel, or some number of reels less than the total number of reels in the machine.

Also in the alternative, or in addition, the player may be given the option to force a reel to stop at the same position as a previous reel. Again, if a player elects this option, the probability of winning is increased, and so the payoff table should be adjusted generally downwards, and/or additional money should be deposited.

The gaming machine may be configured to include each or any of the foregoing embodiments, in any desired combination. In other respects the gaming machine may operate as a conventional slot machine, thereby providing the popular ambience and excitement of slot-machine gaming, but with more varied, more interesting, and more interactive play possibilities.

A more complete understanding of the method and apparatus for gaming will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The present invention provides a method and apparatus for gaming, that overcomes the limitations of the prior art. In the detailed description that follows, like element numerals are used to describe like elements appearing in one or more of the figures.

Figure 1:
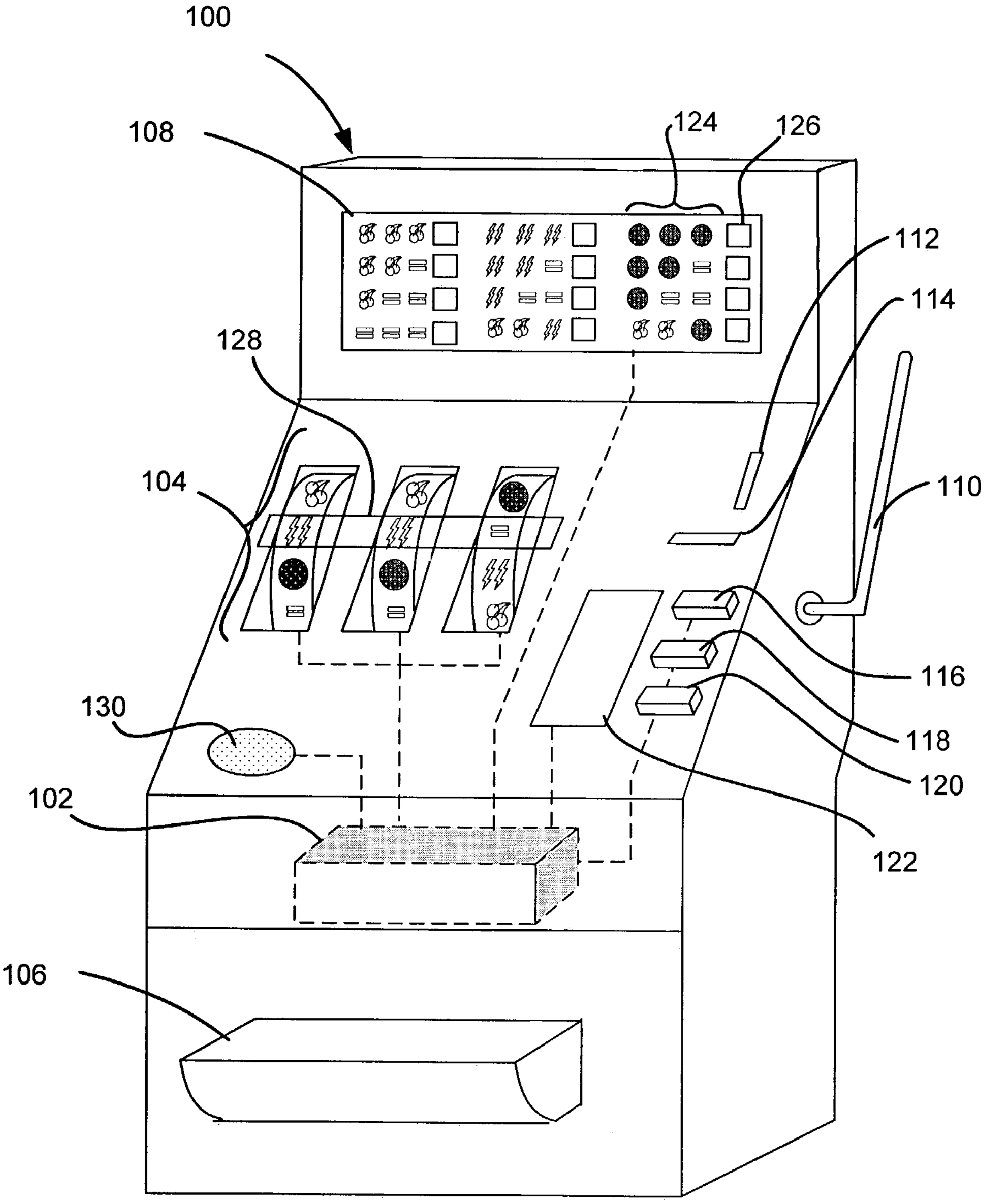
FIG. 1 shows an exemplary gaming apparatus according to an embodiment of the invention.

FIG. 1 shows a exemplary slot machine 100 according to the invention. Slot machine 100 may closely resemble a traditional slot machine, but differs from a conventional slot machine in its operation.

Like a traditional machine, slot machine 100 has a plurality of reels 104 bearing a plurality of different symbols. The current state of the machine and game results are displayed in the result window 128 encompassing the reels 104. Reels 104 may be physical reels or may be simulated reels shown in a CRT, LCD, or other display device. Either way, reels 104 are operated under the control of a computer 102 as known in the art, to display results randomly determined by the computer. Computer 102 may reside in the console of machine 100 (as shown), or in the alternative, may be remotely located and connected to the reels via a network connection. Whether or not machine 100 includes its own computer 102, multiple slot machines like machine 100 may be monitored and/or controlled from a central location via a network connection, as known in the art.

Machine 100 additionally includes a slot 112 wherein coins or tokens may be deposited as payment, and/or a slot 114 for accepting credit cards or debit cards, as known in the art. In general, any desired devices for accepting payment may be included. Winnings may be deposited in hopper 106. Machine 100 further comprises a plurality of buttons 116, 118, and 120 for interacting with users, and a lever 110 for initiating play of a game, which are also connected to computer 102. Of course, the physical form of these actuators is not restricted to the embodiment depicted. By depressing different ones of buttons 116, 118, and 120, a user may initiate various different modes of play afforded by the invention, as described later in the specification.

Machine 100 further includes a view screen 122, such as a CRT, LCD, active matrix, or other display device, for communicating with users before, during, and after play of a game. Such communication may be particularly useful for instructing users that may not be familiar with the novel methods of play that machine 100 may provide. Like other active elements of machine 100, view screen 122 may be operated under the control of computer 102.

A display 108 showing a payout table, or portion of a payout table, may also be provided, as known in the art. The payout table display 108 includes various symbol combinations, such as combination 124, and the payout amount for the current bet, or for a bet of a pre-determined size, in an adjacent display 126. Unlike conventional machines in which the payout table does not change during play of a game, the payout table is subject to adjustment, depending the actions of the user. Accordingly, changes to the payout table may be reflected on the display during play of a game. Display 108 may be operated under the control of computer 102 to display the current payout table. In the alternative, or in addition, the current payout table, or portion of a payout table, may be displayed in view screen 122.

Machine 100 further includes a loudspeaker 130 under the control of the computer 102. The loudspeaker may be used to generate bells and other tones popularly associated with slot machine play. It may also be used to generate verbal messages, if desired. Verbal messages may be used to indicate to options available to the player in the novel method of game play. For example, if a reel is in condition for re-spinning, a message may state, "select 're-spin' to spin the last reel again." Such information may also be presented on view screen 122.

Figure 2:
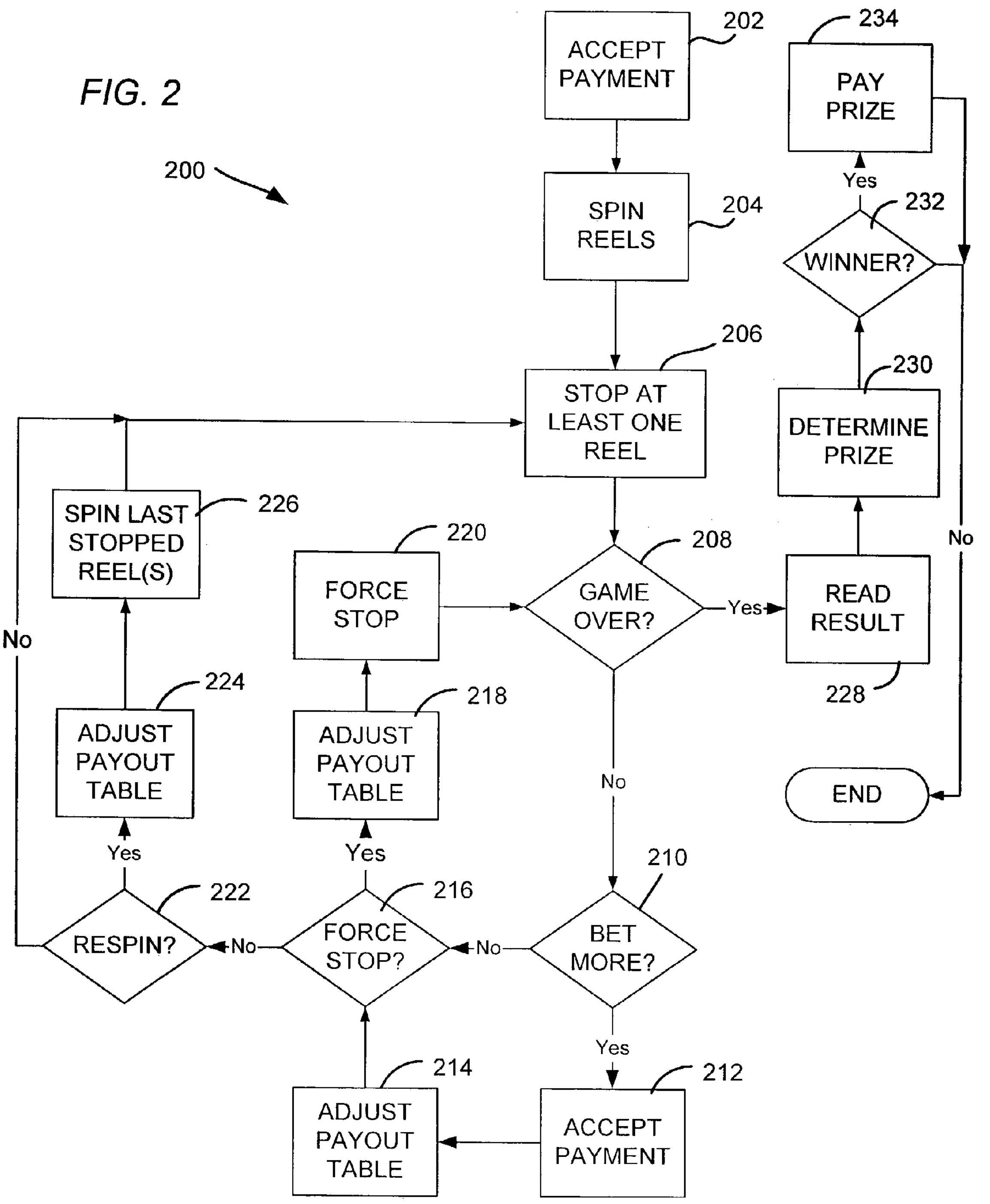
FIG. 2 is a flow diagram illustrating exemplary steps of a method according to the invention.

FIG. 2 is a flow diagram illustrating exemplary steps of a method 200 for gaming using a machine such as slot machine 100. Method 200 may begin with receipt of payment at step 202. Devices for receiving payment in the form of tokens, coin, currency, credit cards, or debit cards are well known in the art. Any suitable method for receiving payment may be used. The payment received may comprise a wager on the game to be played.

At step 204, the machine's reels are "spun." This may include the actual spinning of physical wheels bearing symbols, or a simulated spinning of simulated reels. It is not necessary that an actual or apparent rotation of a symbol reel be performed. In more exact terms, step 204 describes an event signifying that the game of chance has begun. A signal as simple as an illuminated light, or the sounding of a tone, would suffice. The game itself involves nothing more than the random selection of a combination of symbols, which can be performed efficiently by a computer. The spinning of a symbol reel merely represents a more dramatic and more traditional signal for the start of a game, hearkening back to the days in which the outcome was determined by the mechanical action of the spinning reels. Step 202 may be initiated by pulling a lever arm or actuating some other form of start switch, if desired.

At step 206, at least one "reel" is "stopped," while the remaining reels remain "spinning." In less traditional terms, step 206 describes the selection of a least one symbol of a symbol combination, and the display of the selected symbol. Stopping a symbol reel with a symbol appearing in a view window is but one way to accomplish this. Another suitable method is to display the selected symbol on an electronic display.

At step 208, a determination is made whether the game is over. If symbols remain to be selected, the game is obviously not over. In addition, unlike a traditional slot machine, the game is not necessarily over even after all symbols have been selected, such as when all reels have stopped. The user may elect to re-spin one or more reels, or otherwise re-select one or more symbols of the combination. Hence, if all symbols have been selected, the game should not necessarily be considered over unless the player indicates that it is finished, either by taking some specified action or by abstaining from some action. For example, a player may be given the opportunity, after all the reels have stopped, to continue playing by pulling on the lever arm of the machine. If the player does not do so within a specified time, for example, five seconds, the game is considered over.

At step 210, a player may be offered the option of wagering an additional amount. If the player selects this option, then additional payment is accepted at step 212. Selection of the option may be performed in any suitable manner, for example, by depressing a button on the console of the gaming machine. One way additional payment may be accepted is by the deposit of additional money or tokens into the machine. Another way is by crediting some or all of the player's accrued winnings to the additional wager. This may be appropriate, for example, if the player elects to re-spin after receiving a winning combination, or in machines that permit the accrual of winnings between games.

After payment is accepted, the payout table is adjusted at step 214. Methods of calculating a payout table are well understood in the art. In general terms, the payout table reflects the probability of each winning combination, given the machines present state (e.g., one symbol already selected), less the designated house percentage. In the case of an additional wager, the adjusted payout table may be, in effect, the sum of two tables: the original table as it existed at the initiation of the game, and a new table for the additional wager, given the probabilities as they exist at that time. Optionally, the player may be given the option of viewing the adjusted payout table before, after, or both before and after wagering an additional amount.

At step 216, the player may be given the option of forcing a second (or other) reel to stop at the position of a reel that has already stopped. By selecting this option, a player may increase the probability of winning, at the cost of a diminished payout. In more precise terms, a player may be given the option of causing one or more symbols of the combination to be the same as a symbol already selected. For example, in the case of a three-reel slot machine, the second reel may be caused to stop at the same symbol as the first reel, while the third reel remains spinning,-eventually coming to rest at a randomly selected position. Selection of this option may occur by any suitable method, such as by selecting a button on the machine console.

If the player elects to "force a stop" —i.e., cause a symbol of the combination to be equal to a symbol already selected— then the payout table is adjusted to account for the increased probability of winning, at step 218. As before, the player may be given the option of viewing the adjusted payout table before and/or after electing this option. After the payout table is adjusted, the symbol is selected as designated, in other words, the reel is forced to stop at the selected symbol, and the game play returns to step 208 if all reels have stopped, or to step 206 if additional reels remain to be stopped, both steps previously discussed.

At step 222, the player may be given the option of "re-spinning a reel" —i.e., rejecting a previously selected symbol in exchange for another randomly selected symbol, again at the cost of a diminished payout to account for the increased probability of winning that this option affords. The player may select this option in any suitable manner, such as by depressing a button on the console or pulling on the lever arm of the machine after a reel has stopped. Optionally, the player may be shown the adjustment to the payout table that selection of this option entails, before and/or after the option is selected. If the option is selected, the payout table is appropriately adjusted at step 224, and one or more of the stopped reels are spun—, i.e., an alternate symbol is randomly selected—at step 226. The method then returns to step 206, previously discussed. If the re-spinning option is not selected at step 222, the method may return directly to step 206.

The various options made available through steps 210, 216, and/or 222 may considerably extend the length of play, provide for more interaction by the player, and allow the player to select the win probability versus payout that fits her preferences or mood. Indeed, it is conceivable that play could be extended until the payout table is adjusted to some amount less than the initial wager for the highest-paying symbol combination, if desired. Eventually, however, the player will elect to terminate the game, or the game will be otherwise deemed over, at step 208. Subsequent steps 228, 230, 232 and 234 represent any suitable steps for terminating a game, as known in the art. At step 228, the final symbol combination is read. A prize amount is determined at step 230, based on the wagered amount and the final payout table. At step 232, if the result is not a winning result, operation of the machine terminates in preparation for a new game. If the result is a win, the calculated prize is paid at step 234, and then operation 200 terminates. Prizes are typically paid in coins or tokens, although any suitable payment method may be used.

Having thus described a preferred embodiment of a method and apparatus for gaming, it should be apparent to those skilled in the art that certain advantages of the within system have been achieved. It should also be appreciated that various modifications, adaptations, and alternative embodiments thereof may be made within the scope and spirit of the present invention. For example, an embodiment combining different innovative features has been illustrated, but it should be apparent that the inventive concepts described above would be equally applicable to methods that employ only a selected few, or even a single one, of these novel features. The invention is further defined by the following claims.

What is claimed is:

1. In conjunction with a gaming apparatus for randomly determining a combination of symbols, a method for gaming comprising:

receiving an initial wager amount, the wager conferring eligibility to win an amount according to a first payout table defining first win amounts for selected symbol combinations;

randomly determining at least one symbol of a combination of symbols;

displaying the at least one symbol prior to determining every symbol of the combination of symbols;

receiving an input after displaying the at least one symbol, the input directing the gaming apparatus to set a second symbol of the combination of symbols equal to the at least one symbol;

setting a second symbol of the combination of symbols equal to the at least one symbol, in response to the input;

accepting an additional wager amount after displaying the at least one symbol;

in response to accepting the additional wager amount, adjusting the payout table based on the additional wager amount and the at least one symbol to provide a second payout table defining a second win amount for a defined one of the selected symbol combinations and for a total wager amount equal to a sum of the initial and additional wager amounts, the second win amount being not equal to a corresponding one of the first win amounts defined by the first payout table for the defined one of the selected symbol combinations and for the total wager amount, wherein the adjusting the payout table is performed after the second symbol is set equal to the at least one symbol, prior to randomly determining at least one remaining symbol of the combination of symbols;

randomly determining at least one remaining symbol of the combination of symbols to determine a game result; and awarding a prize amount based on the game result and the second payout table.

2. The method of claim 1, wherein accepting an additional wager is preceded by a step of receiving an input indicating a desire to deposit the additional wager amount.

3. The method of claim 1, wherein the gaming apparatus comprises a slot machine having a plurality of reels, each reel bearing a plurality of symbols, and wherein displaying the at least one symbol comprises stopping at least one of the plurality of reels, while remaining reels of the slot machine continue spinning.

4. The method of claim 1, wherein the gaming apparatus comprises a slot machine having at least one view screen, the at least one view screen displaying plurality of simulated reels, each simulated reel bearing a plurality of symbols, and wherein displaying the at least one symbol comprises displaying at least one of the plurality of simulated reels in a stopped position, while remaining simulated reels of the slot machine are displayed as spinning.

5. The method of claim 1, further comprising displaying at least a portion of the second payout table after adjusting the payout table based on the additional wager amount and the at least one symbol.

6. The method of claim 1, further comprising displaying at least a portion of an anticipated payout table, prior to adjusting the payout table based on the additional wager amount and the at least one symbol, wherein the anticipated payout table comprises the second payout table.

7. In conjunction with a gaming apparatus for randomly determining a combination of symbols, a method for gaming comprising:

receiving a wager amount, the wager conferring eligibility to win an amount according to a payout table defining first win amounts for selected symbol combinations;

randomly determining a first symbol of the combination of symbols;

displaying the first symbol prior to determining other symbols of the combination of symbols;

receiving an input after displaying the first symbol, the input directing the gaming apparatus to set a second symbol of the combination of symbols equal to the first symbol;

setting a second symbol of the combination of symbols equal to the first symbol in response to the input;

adjusting the payout table based on the first symbol to provide an adjusted payout table defining a second win amount for a defined one of the selected symbol combinations and for the wager amount, the second win amount being not equal to a corresponding one of the first win amounts defined by the payout table for the defined one of the selected symbol combinations and for the wager amount;

randomly determining at least one remaining symbol of the combination of symbols to determine a game result; and awarding a prize amount based on the game result and the adjusted payout table.

8. The method of claim 7, further comprising accepting an additional wager amount after displaying the first symbol.

9. The method of claim 7, further comprising receiving a second input after displaying the first symbol, the second input directing the gaming apparatus to randomly determine the at least one remaining symbol a second time;

adjusting the adjusted payout table based on a state of the gaming apparatus when the second input is received; and randomly determining the at least one remaining symbol of the combination of symbols a second time, in response to the second input.

10. The method of claim 7, wherein the gaming apparatus comprises a slot machine having a plurality of reels, each reel bearing a plurality of symbols, and wherein displaying the first symbol comprises stopping at least one of the plurality of reels, while remaining reels of the slot machine continue spinning.

11. The method of claim 7, wherein the gaming apparatus comprises a slot machine having at least one view screen, the at least one view screen displaying a plurality of simulated reels, each simulated reel bearing a plurality of symbols, and wherein displaying the first symbol comprises displaying at least one of the plurality of simulated reels in a stopped position, while remaining simulated reels of the slot machine are displayed as spinning.

12. The method of claim 7, further comprising displaying at least a portion of the adjusted payout table after adjusting the payout table based on the at least one symbol.

13. The method of claim 7, further comprising displaying at least a portion of an anticipated payout table, prior to adjusting the payout table based on the first symbol, wherein the anticipated payout table comprises the adjusted payout table.

14. In conjunction with a gaming apparatus for randomly determining a combination of symbols, a method for gaming comprising:

receiving an initial wager amount, the wager conferring eligibility to win an amount according to a first payout table defining first win amounts for selected symbol combinations;

randomly determining at least one symbol of a combination of symbols;

displaying the at least one symbol prior to determining every symbol of the combination of symbols;

receiving an input after displaying the at least one symbol, the input directing the gaming apparatus to randomly determine the at least one symbol a second time;

accepting an additional wager amount after displaying the at least one symbol;

in response to accepting the additional wager amount, adjusting the payout table after the input is received based on the additional wager amount and the at least one symbol to provide a second payout table defining a second win amount for a defined one of the selected symbol combinations and for a total wager amount equal to a sum of the initial and additional wager amounts, the second win amount being not equal to a corresponding one of the first win amounts defined by the first payout table for the defined one of the selected symbol combinations and for the total wager amount;

randomly determining the at least one symbol of the combination of symbols a second time, in response to the input;

randomly determining at least one remaining symbol of the combination of symbols to determine a game result; and awarding a prize amount based on the game result and the second payout table.

15. The method of claim 14, wherein receiving an input is performed after each symbol of the combination of symbols has been determined a first time, and before the game result has been determined.

16. The method of claim 14, wherein the gaming apparatus comprises a slot machine having a plurality of reels, each reel bearing a plurality of symbols, and wherein displaying the at least one symbol comprises stopping at least one of the plurality of reels, while remaining reels of the slot machine continue spinning.

17. The method of claim 14, wherein the gaming apparatus comprises a slot machine having at least one view screen, the at least one view screen displaying plurality of simulated reels, each simulated reel bearing a plurality of symbols, and wherein displaying the at least one symbol comprises displaying at least one of the plurality of simulated reels in a stopped position, while remaining simulated reels of the slot machine are displayed as spinning.

18. The method of claim 14, further comprising displaying at least a portion of the second payout table after adjusting the payout table based on the additional wager amount and the at least one symbol.

19. The method of claim 14, further comprising displaying at least a portion of an anticipated payout table, prior to adjusting the payout table based on the additional wager amount and the at least one symbol, wherein the anticipated payout table comprises the second payout table.

* * * * *